US006401837B1

(12) United States Patent
Pan

(10) Patent No.: US 6,401,837 B1
(45) Date of Patent: Jun. 11, 2002

(54) CHARGING TYPE MULTIPURPOSE COMBINATION TOOL

(75) Inventor: Ya Ping Pan, Shanghai (CN)

(73) Assignee: Shanghai Xing Te Hao Industrial Co., Ltd., Shanghai (CN)

( * ) Notice: Subject to any disclaimer, the term of this patent is extended or adjusted under 35 U.S.C. 154(b) by 3 days.

(21) Appl. No.: 09/595,811

(22) Filed: Jun. 16, 2000

(30) Foreign Application Priority Data

Sep. 1, 1999 (CN) .......................................... 99239510

(51) Int. Cl.[7] ............................................... B23B 31/07

(52) U.S. Cl. ....................... 173/217; 173/104; 173/216; 173/178

(58) Field of Search ................................ 173/216, 217, 173/132, 178, 48, 104, 93.5; 279/19.3, 19.4, 19.5, 19.1, 75, 905

(56) References Cited

U.S. PATENT DOCUMENTS 3,730,281 A * 5/1973 Wood .......................... 173/48
4,091,880 A * 5/1978 Troutner et al. ............ 173/217
4,702,485 A * 10/1987 Rohm ....................... 279/19.4
5,350,026 A * 9/1994 Markus et al. .............. 173/178
5,738,177 A * 4/1998 Schell et al. ................ 173/178
6,089,330 A * 7/2000 Miescher et al. ........... 173/132
6,241,026 B1 * 6/2001 Wache et al. ................. 279/75
6,257,351 B1 * 7/2001 Ark et al. ................... 179/217
6,315,060 B1 * 11/2001 Schuda et al. .............. 173/132

* cited by examiner

*Primary Examiner*—Scott A. Smith
(74) *Attorney, Agent, or Firm*—Akin Gump Strauss Hauer & Feld, LLP

(57) ABSTRACT

A charging type multipurpose combination tool comprises a main body portion releasably connectable to a plurality of interchangeable tool head portions through a locking mechanism. The main body portion includes an electric motor, a speed control switch and a battery set, while the interchangeably tool head portion may be arranged to form an electric drill, a sanding machine, an angular grinding machine, a cement mixer, a sawing machine, an engraving machine, and the like. The locking mechanism includes an external spline fixed on the electric motor output shaft for rotation therewith and an internal spline located on the locking head that meshes with the external spline for transmitting power to the tool head portion. A locking piece on the main body portion has wedged-shaped faces that releasably engage a locking head on the tool head portion.

6 Claims, 8 Drawing Sheets

CHARGING TYPE MULTIPURPOSE COMBINATION TOOL

FIELD OF THE INVENTION

The present invention relates in general to electrical power tools, and more particularly to a multipurpose rechargeable power tool with a main body portion for connection to various different types of interchangeable tool heads.

BACKGROUND OF THE INVENTION

The electric tool is a common tool with very widespread applications in households and factories. In the past, it has often been necessary to purchase multiple tools in order to perform multiple processes or operations such as drilling, planing, shearing, grinding, and like, resulting in high purchase cost and carrying inconvenience. In order to overcome the drawbacks of high purchase expense and carrying inconvenience, many patents and documents have covered various forms of combination electric tools.

Chinese Patent No. ZL93220617.4, for example, discloses a type of electric tool assembly, wherein a main machine part of an electric motor is coupled with multiple different tool heads to drive different kinds of tools, so as to provide multipurpose functioning with one machine. However, that patent does not disclose how the tool head is coupled with the main machine part.

Chinese Patent No. ZL97201237.0, for example, discloses a combination type multipurpose electric tool, and sets forth a method of coupling the main machine part with tool head. It can be noted from the technique disclosed by that patent, that the main machine part and tool head utilize male and female screw threads to make the coupling. This kind of coupling method is very inconvenient when replacing tool heads, and makes it easy to damage the output shaft or electric motor.

Presently, electric power tools on the market include direct coupling of the electric motor with a tool head, utilizing a close fit between both to accomplish this process. However, despite the simple arrangement, the coupling is of low sustaining force, of rather inferior reliability, low safety, and is thus inadvisable for use.

It can be clearly noted from the conditions of the above-mentioned disclosed patent techniques and market products, that the method of coupling multipurpose tool heads with one machine has become the crux of multipurpose combination tools.

OBJECTIVE OF THE INVENTION

It is an object of the present invention to provide a charging type multipurpose combination tool that includes a main body portion having an electric motor, a speed control switch and battery set, that can be releasably coupled to a tool head portion through a locking mechanism, so as to overcome the above-mentioned drawbacks of the prior art.

SUMMARY OF THE INVENTION

The present invention divides the existing electric tool into a main body portion and a tool head portion. The main body portion may include an electric motor, a speed control switch, a battery and the like components, while the tool head portion may be provided with a speed control device, a direction control device, a transmission mechanism and the like components. The above-mentioned elements are all prior art and therefore will not be further described. The main body portion couples with the tool head portion through a locking mechanism.

The locking mechanism comprises an external spline with guiding faces fixed on the electric motor output shaft through conventional mechanical means, an internal spline integrally connected to the transmission mechanism inside the tool head portion, a locking piece rotatable over a predetermined distance, a locking head, and the like components.

The locking piece includes wedge-shaped faces with guide tabs to facilitate rotation of the locking piece. The locking piece is sleeved at the outer side of the external spline and is rotatable in the clockwise and counterclockwise directions over a predetermined distance. The locking piece is coupled with a locking thrust ring fixed on the housing of the main body portion.

The locking head is provided at the outer side of the internal spline, and is fixed on the housing of the tool head portion. Bosses are provided at an end portion of the tool head portion, and a wedging slot is formed between the bosses and the housing of the tool head portion. The wedge-shaped faces of the locking piece and the bosses of the locking head releasably lock together to thereby releasably lock the tool head portion to the main body portion.

The internal and external splines mate with each other to transmit electric motor power to the tool head portion. The tool head portion may be provided with convex strips at an end portion thereof. The convex strip preferably mate with concave slots provided at an inner side of a front end of the main body portion to enable the tool head portion to be easily inserted into the main body portion.

The present invention can form different tools with a single main body portion and different interchangeable tool head portions by merely changing one tool head portion for another. The tool head portions can be in the form of an electric drill head assembly to be rapidly used as an electric drill; the tool head portion can be in the form of a triangular sanding head assembly to be used as a sanding machine; the tool head portion can be in the form of an angular grinding machine head assembly to be used as angular grinding machine; the tool head portion can be in the form of a cement or concrete mixing assembly to be used as a cement concrete mixing machine; the tool head portion can be in the form of a reciprocating-type sawing machine to be used as reciprocating sawing machine, and so on. The various tool head portions mentioned above are well known and, in accordance with the present invention, can be easily connected to and disconnected from the main body portion.

It can be noted clearly from the above that the electric tool of the present invention can overcome the disadvantages associated with single-purpose electric power tools by providing a multipurpose power tool with a single motor and interchangeable tool heads that can be quickly and conveniently connected and disconnected to the motor, and can be easily carried.

BRIEF DESCRIPTION OF THE DRAWINGS

These and other features of the present invention will be described in conjunction with the drawings, wherein.

DETAILED DESCRIPTION OF THE INVENTION

Figure 1:
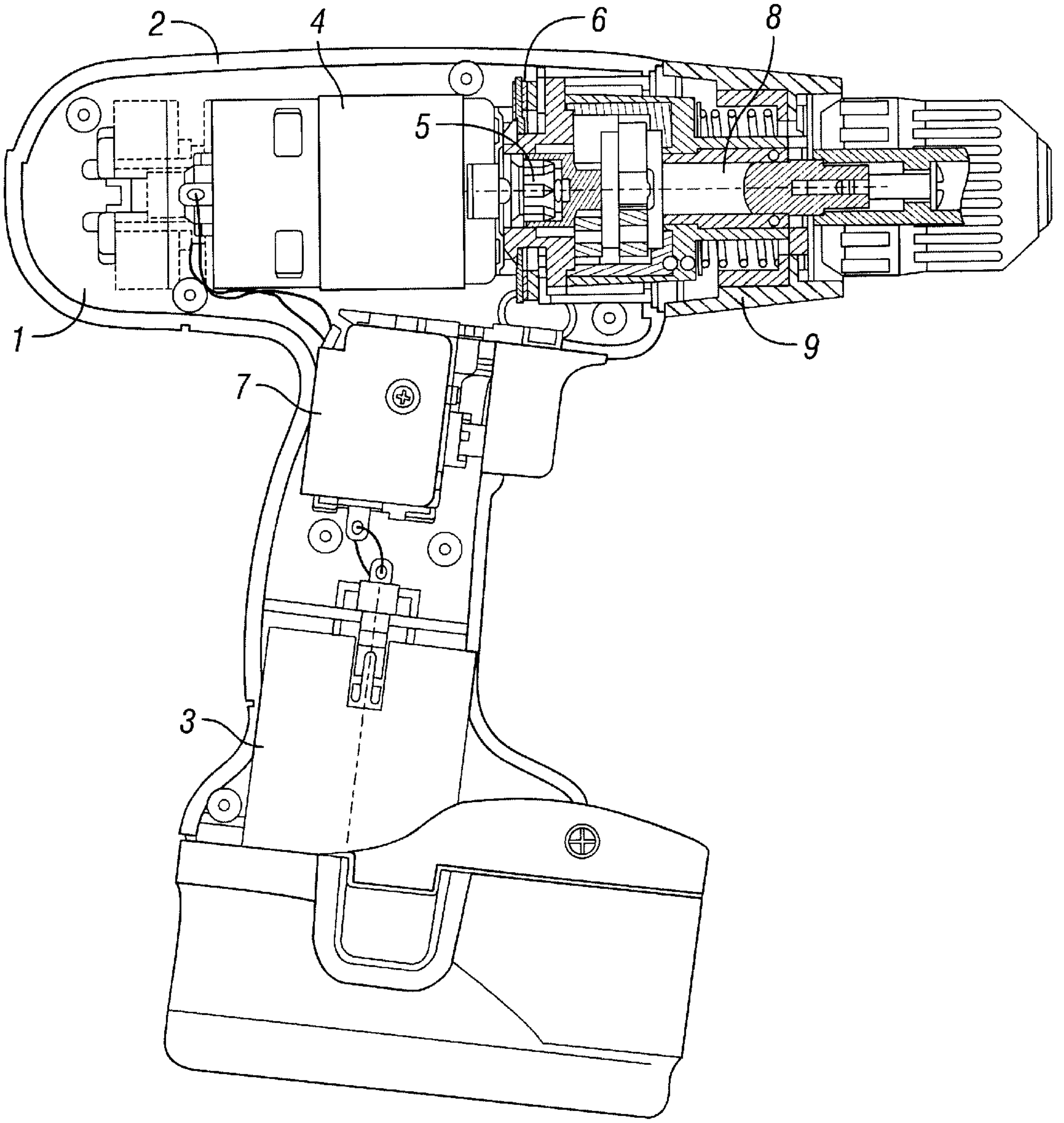
FIG. 1 is a side elevational view in partial cross section of an electric power tool according to the invention having a main body portion and a tool head.

The accompanying drawings show an embodiment of the present invention. With particular reference to FIG. 1, the electric power tool comprises a main body portion 1 and a tool head portion 8 that are mutually connectable and disconnectable. The main body portion 1 serves as a power source or driver for the tool head portion 8, while the tool head portion 8 can include various tool head structures for sawing, mixing, grinding and the like, as known in the prior art. The main body portion 1 includes an electric motor 4, a speed control switch 7, an insertion-type battery set 3, and the like components. In accordance with the present invention, the tool head portion 8 couples with the main body portion 1 through a locking mechanism 5.

Figure 2:
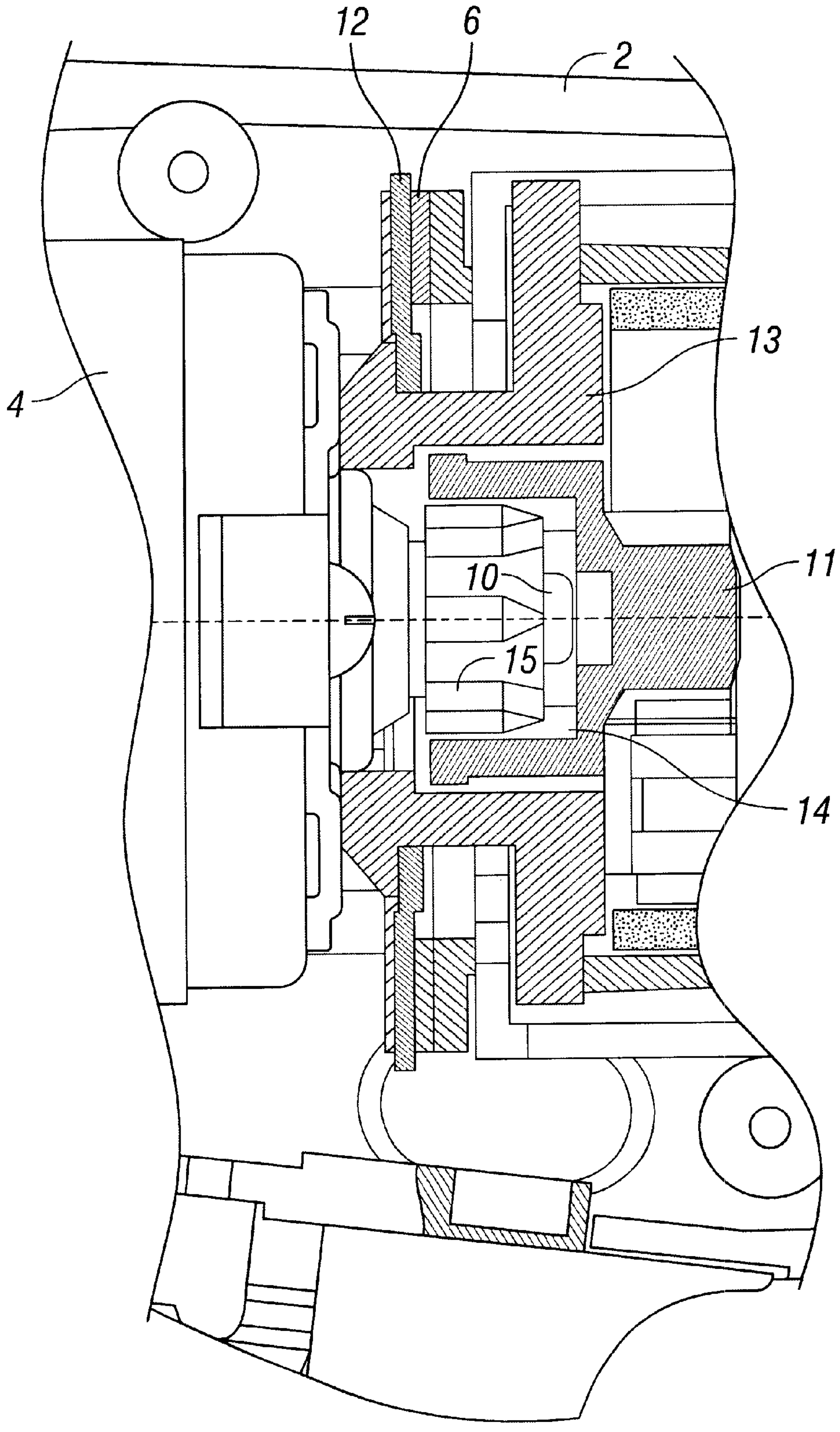
FIG. 2 is an enlarged sectional view of a locking mechanism according to the invention for use with the power tool.

FIG. 2 is a structural diagram of the locking mechanism 5. As shown in FIG. 2, the locking mechanism 5 comprises an external spline 15 (see also FIG. 10) that is provided with guide faces 20. The external spline 15 is fixed on the output shaft 10 of the electric motor 4 by conventional mechanical means. The locking mechanism 5 also includes an internal spline 14 that is provided with guide faces 21. The internal spline 14 is connected to a transmission mechanism 11 located inside the tool head portion 8. A locking piece 12 and a locking head 13 together with like components also form part of the locking mechanism 5, as will be described in greater detail below.

Figure 3:
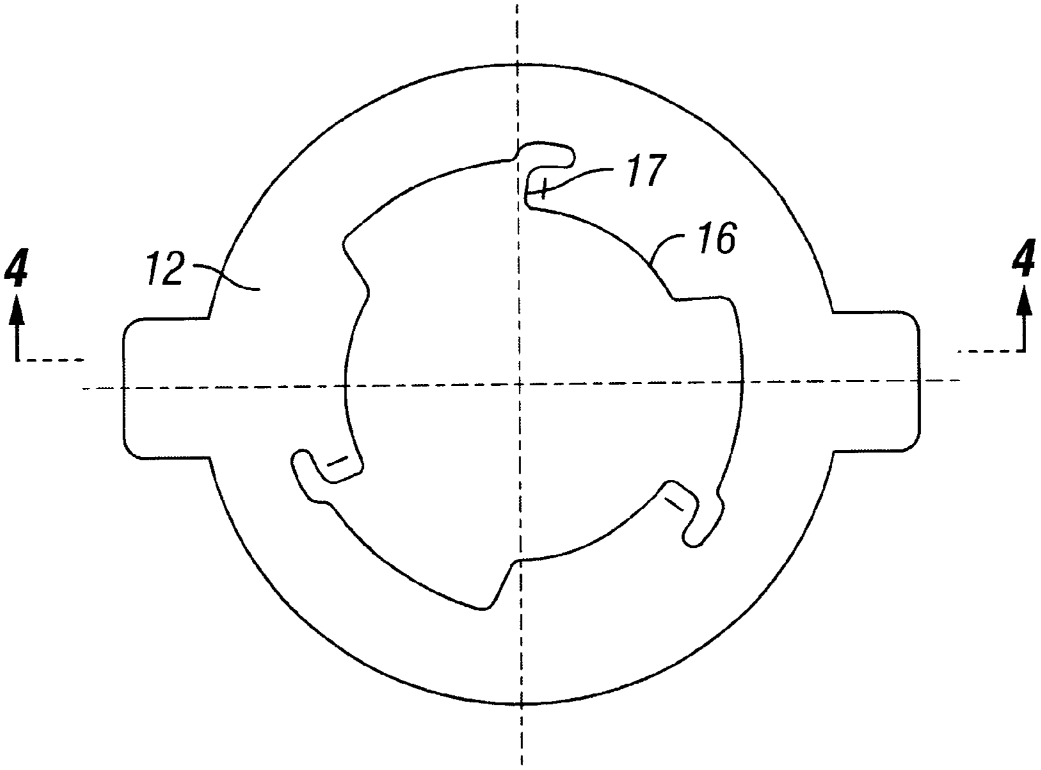
FIG. 3 is a front elevational view of a locking piece that forms part of the locking mechanism of FIG. 2.
Figure 4:
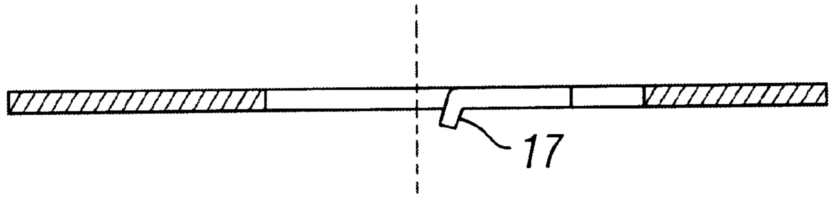
FIG. 4 is a sectional view of the locking ring taken along line 4—4 of FIG. 3.
Figure 5:
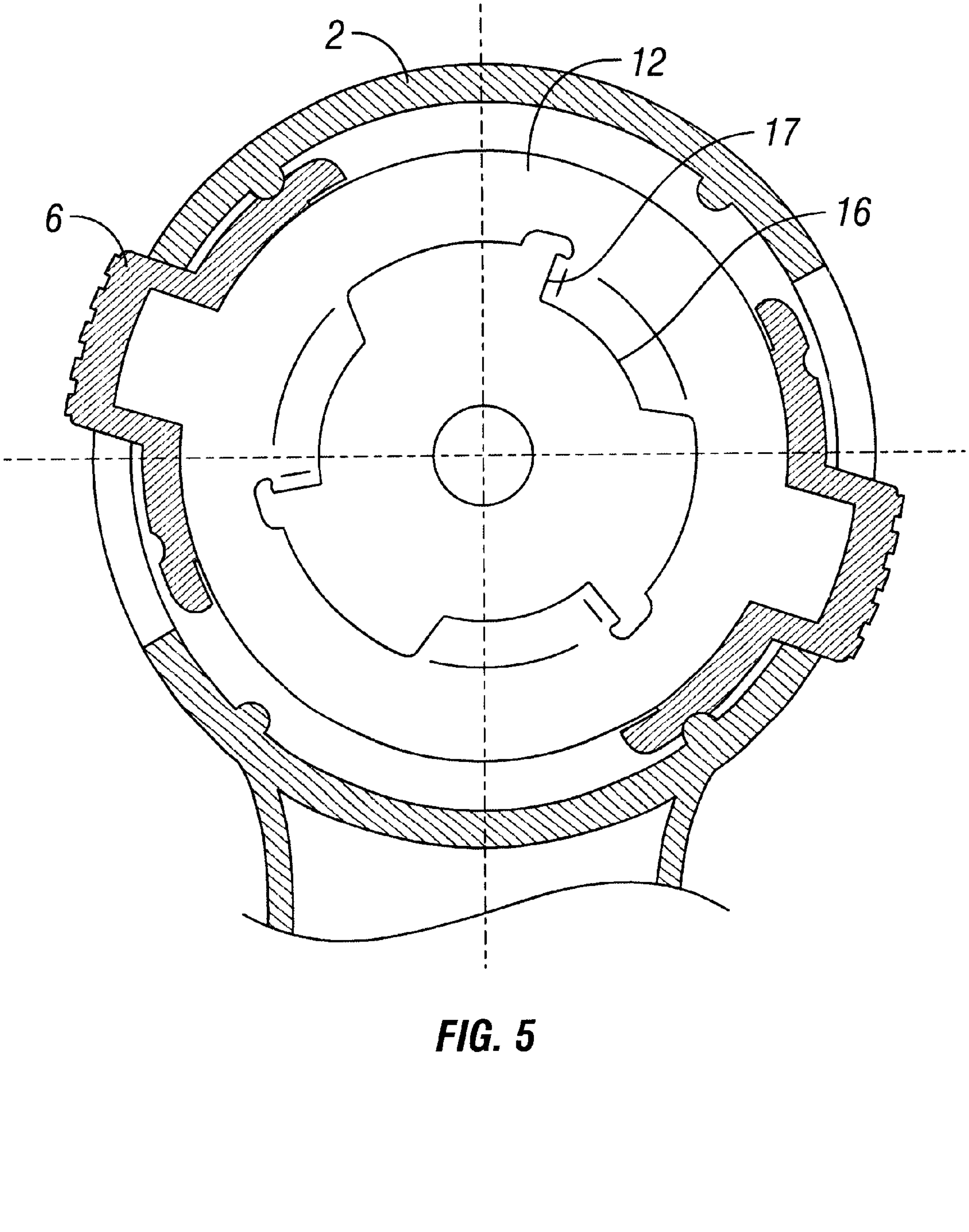
FIG. 5 is a front elevational view of the locking piece and a sectional view of the power main body portion and a thrust ring associated with the locking piece.

FIG. 3 is a schematic structural diagram of the locking piece 12. As shown in FIGS. 3, 4 and 5, the locking piece 12 includes wedge-shaped faces 16 and a guide tab 17 located at one end of each face 16. The locking piece 12 is sleeved at the outer side of the external spline 15, and is rotatable in both the clockwise and counterclockwise directions for a preset distance. A thrust ring 6 is connected to the housing 2 of the main body portion and is also coupled to the locking piece 12 for rotation therewith.

Figure 6:
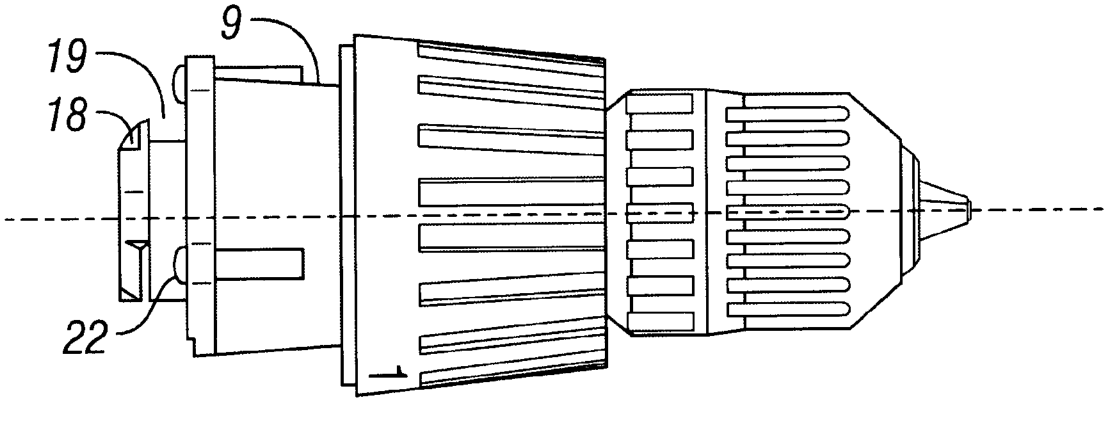
FIG. 6 is a side elevational view of the tool head including a locking head.
Figure 7:
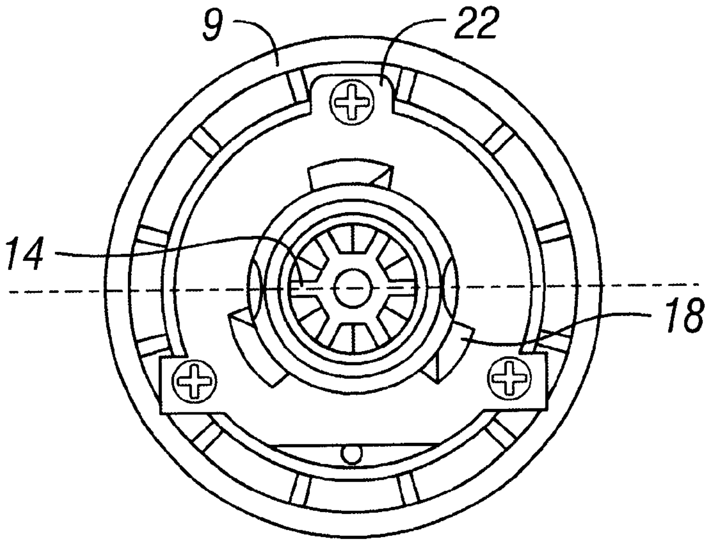
FIG. 7 is a rear elevational view of the tool head.

FIGS. 6 and 7 are schematic structural diagrams of the locking head 13. As shown, the locking head 13 is provided at the outer side of the internal spline 14, and is fixed on the housing 9 of the tool head portion 8. A rear end portion of the locking head 13 is provided with bosses 18, with a wedging slot 19 being formed between the bosses 18 and the housing 9 of the tool head portion 8.

Figure 8:
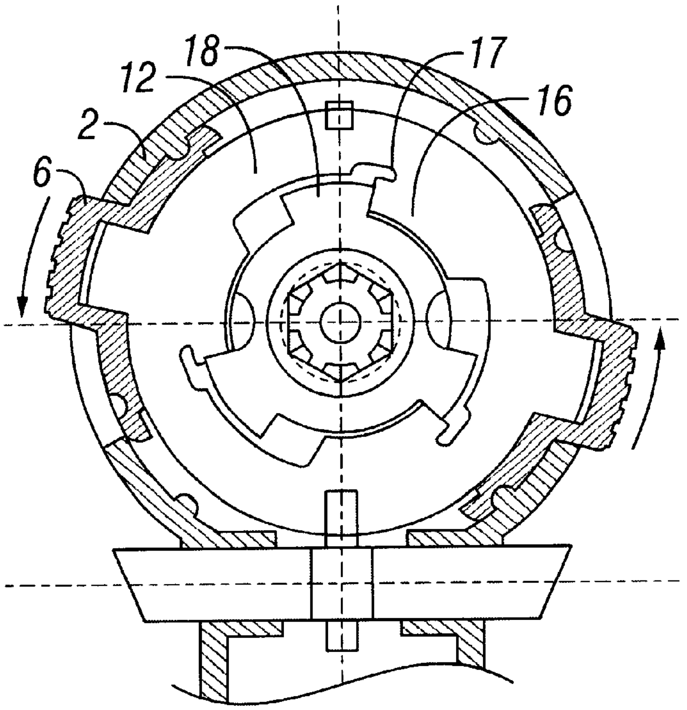
FIG. 8 is a front elevational view similar to FIG. 5 showing the locking piece and locking head in a released or disconnected position.
Figure 9:
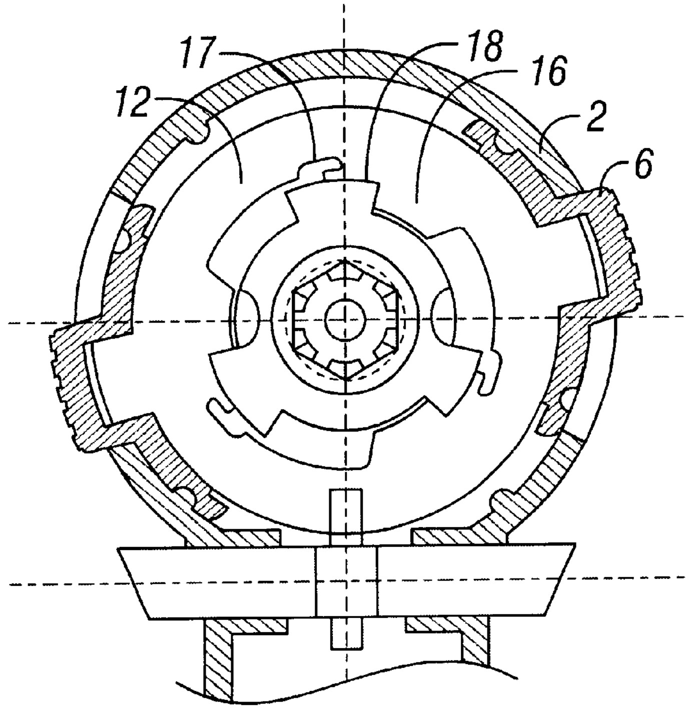
FIG. 9 is a front elevational view similar to FIG. 5 showing the locking piece and locking head in locked position.

FIGS. 8 and 9 show the mating relationship between the locking piece 12 and the locking head 13. After the tool head portion 8 is inserted into the main body portion 1, the tool head portion can be coupled to the main body portion for driving the tool head portion by merely rotating the thrust ring 6 with respect to the housing 2 in a first direction. Rotation of the thrust ring 6 in turn causes rotation of the locking piece 12, to thereby locate the wedge-shaped faces 16 on the locking piece 12 in the wedging slot 19. Conversely, the wedge-shaped faces 16 on locking piece 12 can be released from the wedging slot 19 by rotating the thrust ring 6 in a second direction opposite the first direction to thereby release the tool head portion 8 from the main body portion 1.

Figure 10:
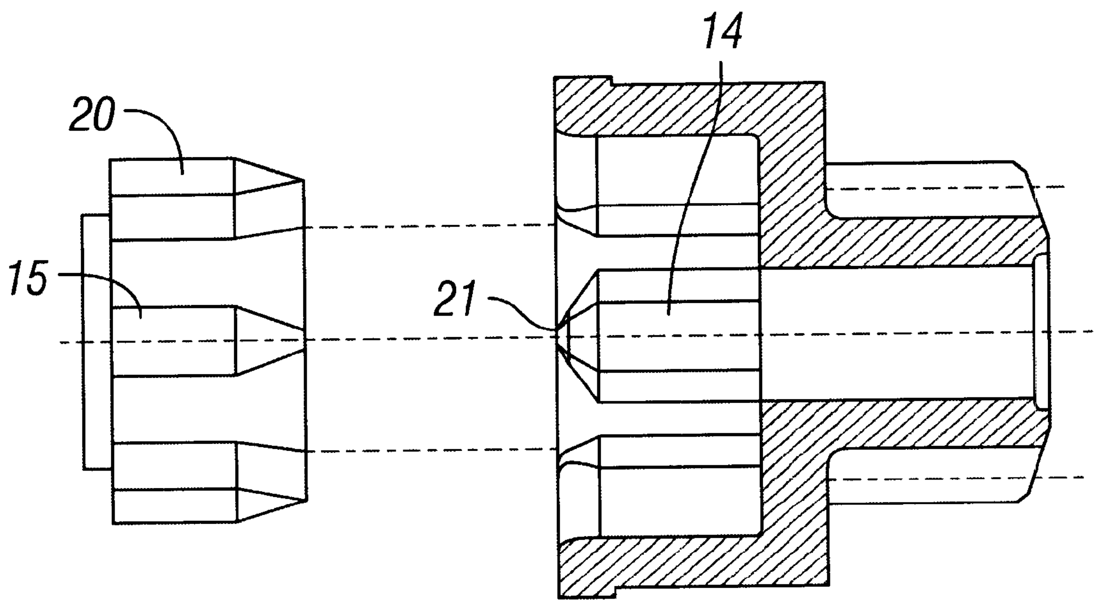
FIG. 10 is a side elevational view of an external spline associated with the main body portion and a sectional view of an internal spline associated with the tool head portion and illustrating their manner of mutual engagement.

FIG. 10 is a structural diagram of the internal spline 14 and external spline 15. As shown, the external spline 15 is inserted into the internal spline 14 through the guided faces 21 to transmit electric motor power to the tool head portion.

Figure 11:
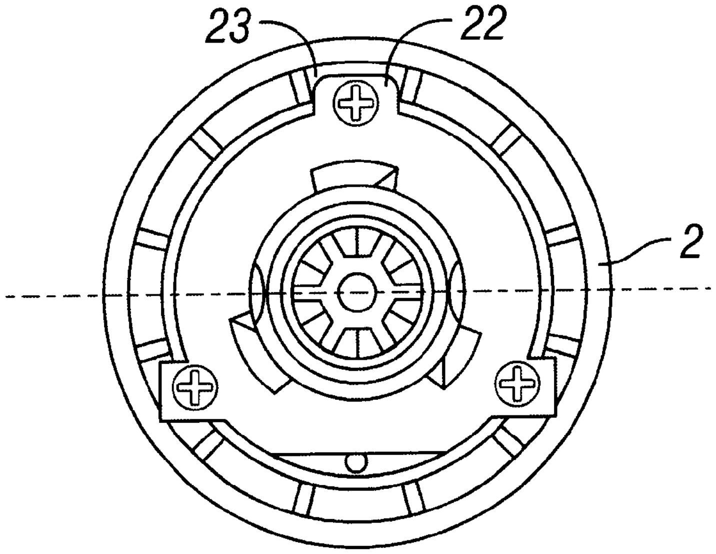
FIG. 11 is a front elevational view of a portion of the main body portion illustrating convex strips of the tool head mated with concave slots of the main body portion.
Figure 11A:
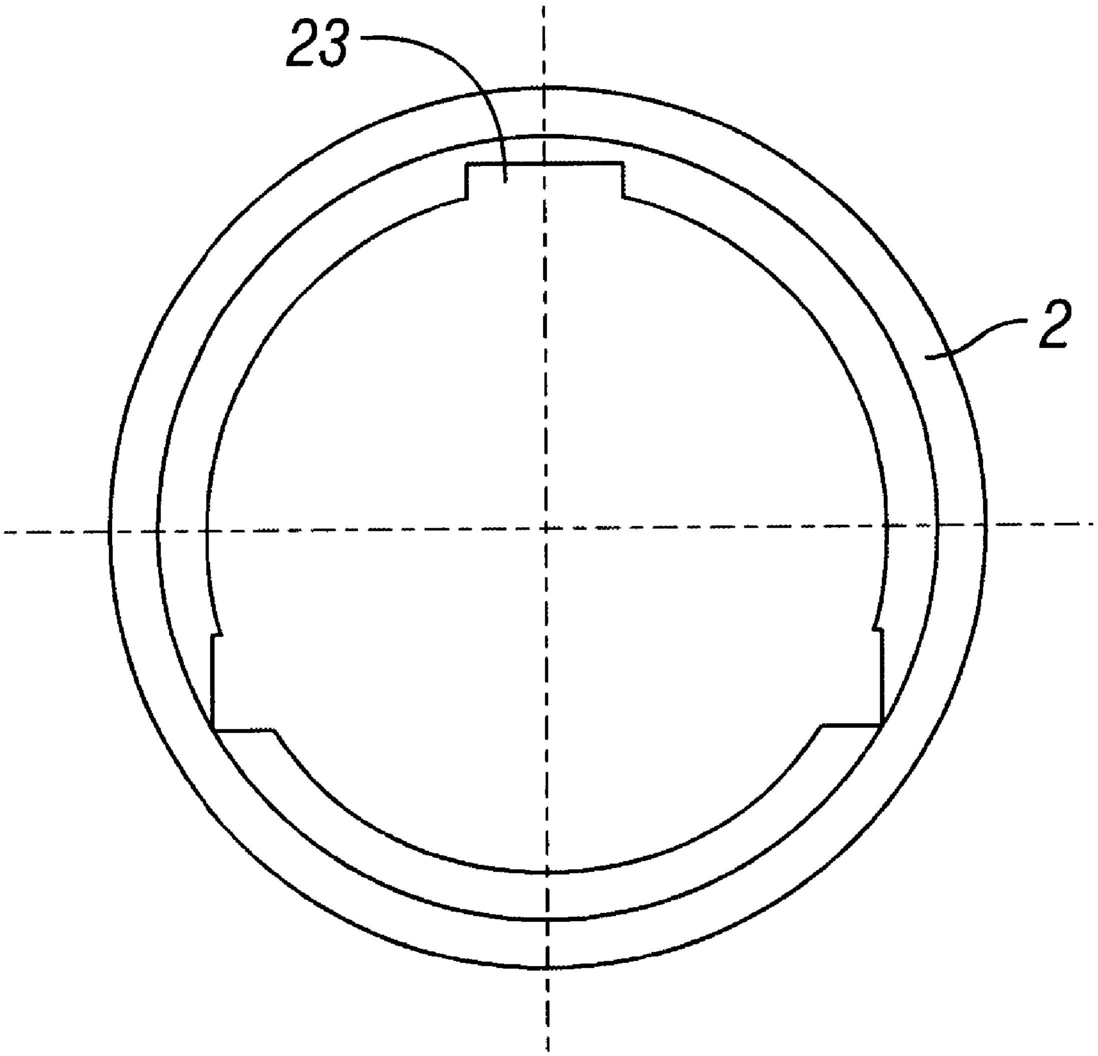
FIG. 11A is a front elevational view similar to FIG. 11 with the convex strips of the tool head removed.

As shown in FIGS. 11 and 11A, the tool head portion is provided at its end portion with strips or tabs 22 which mutually mate with slots 23 provided at the inner side of the forward end of the main body portion 1 to enable the tool head portion 8 to be conveniently inserted into the main body portion 1. Although not shown, the tabs 22 may be convex and the slots 23 may be concave.

Preferably, the number of keyways formed on the above-described internal spline 14 and external spline 15 is approximately five to seven, while the number of concave slots 23 of the main body portion and the number convex strips 22 of the tool head portion are preferably three.

The above-described embodiment is a kind of electric drill or other power tool that is formed by connecting the tool head portion 8 to the main body portion 1. The tool head portion can be provided with variable speed gear arrangements, such as planetary gears that are capable of attaining different rotary speed ranges, while changing gears and gear arrangements can produce reciprocating or swaying motions according to existing arrangements. The tool head portions can be of different types to perform different functions, and a plurality of different tool head portions can be provided for connection to the main body portion to thereby provide a single motor unit that can operate as an electric drill, a sanding machine, an angular grinding machine, a cement concrete mixer, a sawing machine, an engraving machine, and the like.

What is claimed is:

1. A multipurpose combination tool, comprising:

a main body portion (1) including an electric motor (4) with an output shaft (10);

a tool head portion (8) including a transmission assembly (11); and a locking mechanism (5) for coupling the main body portion (1) with the tool head portion (8), the locking mechanism (5) including:

an external spline (15) fixed on the output shaft (10) of the electric motor (4) and provided with guide faces (20);

an internal spline (14) connected to the transmission assembly (11) and provided with guide faces (21);

a locking piece (12) having a wedge-shaped face (16), the locking piece (12) being located at the outer side of the external spline (15);

a locking thrust ring (6) connected to the housing (2) of the main body portion (1) and being coupled with the locking piece;

a locking head (13) located at the outer side of the internal spline (14) on the housing (9) of tool head portion (8), the locking head (13) having bosses at an end portion thereof with a wedging slot (19) being formed between the bosses (18) and the housing (9) of tool head portion (8);

wherein the external spline (15) can be releasably inserted into the internal spline (14), and the wedge-shaped face (16) on the locking piece (12) can be releasably inserted into the wedging slot (19) to thereby releasably connect the tool head portion (8) to the main body portion (1) with the transmission assembly (11) operatively connected to the electric motor (4).

2. The multipurpose combination tool according to claim 1, wherein a rear end portion of the tool head portion is provided with tabs (22) that mate with slots (23) provided on an inner side of a forward end of the main body portion.

3. The multipurpose combination tool according to claim 2, wherein there are three concave slots (23) of the main body portion and three convex strips of the tool head portion (8).

4. The multipurpose combination tool according to claim 1, wherein the locking piece (12) is provided with a guide tab (17) located at one end of the face 16.

5. The multipurpose combination tool according to claim 1, wherein the internal spline (14) and the external spline (15) each comprises approximately five to seven keyways.

6. The multipurpose combination tool according to claim 1, wherein the tool head portion (8) is at least one of an electric drill, a sanding machine, an angular grinding machine, a cement mixer, a sawing machine, and an engraving machine.

* * * * *